Patented July 16, 1940

2,207,983

UNITED STATES PATENT OFFICE 2,207,983

METHOD OF MAKING HALOHYDRIN ETHERS

Charles G. Harford, Wollaston, Mass., assignor to Arthur D. Little, Incorporated, Cambridge, Mass., a corporation of Massachusetts No Drawing. Application February 5, 1938, Serial No. 188,978

19 Claims. (Cl. 260—614)

This invention relates to a method of converting unsaturated organic compounds, characterized by containing one or more double bonds between carbon atoms in their molecular structures, into halohydrin ethers, and to the resulting products.

According to the procedure disclosed herein, it is possible to make halohydrin ethers such as chlorhydrin or bromhydrin ethers from corresponding unsaturated organic compounds in a simple manner involving merely reacting the unsaturated compound with the proper substances in one step, and then separating the resulting components as desired. The necessity of passing through a series of steps is eliminated; the danger of halogenating at other points than those desired is reduced to a minimum; and the yield is good. These features are not true of processes hitherto known.

Briefly, the process of this invention involves the reacting together of an unsaturated organic compound and an alcohol of the classes hereinafter defined with the hypohalite (i. e., hypochlorite or hypobromite) of a tertiary alcohol, whereby there is formed a halohydrin ether and a tertiary alcohol.

A halohydrin contains an alcoholic —OH group, and can therefore form an ether by substitution of another alcohol radical therein. This ether will be a halogenated ether. I will refer to such ethers as halohydrin, chlorhydrin or bromhydrin ethers. A simple example is ethylene chlorhydrin ethyl ether:

Cl—CH$_2$—CH$_2$—O—CH$_2$—CH$_3$

The reaction of the present invention is applicable to all unsaturated organic compounds having an ethylenic double bond between two carbon atoms in the molecule. Common examples are the olefin hydrocarbons. Other examples include cyclic hydrocarbons such as the terpenes, aromatic compounds having a side-chain with an unsaturated carbon linkage therein, and unsaturated derivatives of these various compounds. The linkage between the carbon atoms of the benzene ring, whatever it may be, is of course not included under the term "unsaturated". The criterion of operability of these organic compounds in the process of this invention is the presence in such compounds of the double bond linkage between two carbon atoms,—also referred to as the olefinic or ethlyenic linkage.

The hypochlorite or hypobromite used is characterized by containing a tertiary carbon atom linked to the hypohalite group, thus:

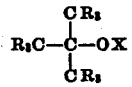

In this formula, X represents the halogen, which may be either chlorine or bromine. Each R may be hydrogen, or an alkyl group, or an aryl group, or a combination of one or more of these. When each R is hydrogen, and X is chlorine, the substance is tertiary butyl hypochlorite, which is the most readily available of the hypohalites of tertiary alcohols. Tertiary butyl hypochlorite and tertiary butyl hypobromite are the simplest members of the tertiary alkyl hypohalites suitable for the purposes of this invention. Alkyl groups may be present in place of one or more of the hydrogens, thus giving higher tertiary alkyl hypohalites (e. g. tertiary amyl hypohalites). Similarly, tertiary aryl or aralkyl hypohalites may be included. Also to be included are those compounds of the type indicated by the formula in which the three R substituents of one or more —CR$_3$ radicals are consociated with each other as well as with the carbon, as in the benzene group. This invention is not, however, limited to the use of any particular one of these tertiary hypohalites, as it is the presence of the linkage between the tertiary carbon atom and the hypohalite radical upon which the operability of the reaction is based, rather than upon the exact characteristics of the various R substitutions.

The class of alcohols to be used in the process of this invention does not include tertiary alcohols, as these are unsuitable for carrying out the reaction involved. This is presumably due to the fact that they are more stable than primary and secondary alcohols under the conditions imposed, and hence are substantially inert to this particular process. In the operation of my process this is a real advantage since the tertiary alcohol liberated in the reaction is inert and therefore neither consumes reagents or gives undesired tertiary ethers as impurities. Primary alcohols as a class are suitable in the process of this invention, and hence aliphatic, aromatic, and cyclic alcohols are suitable as long as they are primary alcohols.

Secondary alcohols occupy an intermediate position between the more stable tertiary alcohols, on the one hand, and the less stable primary alcohols, on the other. By the term "secondary alcohol" I mean an organic compound containing the bivalent =CHOH radical, where each bond is connected to a separate organic radical and hence the term includes aliphatic, aromatic, cyclic, and mixed secondary alcohols.

In my copending application Serial No. 515,640, filed February 13, 1931 (now United States Patent No. 2,107,789), and in my divisional application thereof, Serial No. 686,441, filed August 23, 1933 (now United States Patent No. 2,054,814), I have described methods of making chlorhydrins and chlorhydrin esters by reacting an unsaturated organic compound containing the ethylene group with the hypochlorite of a tertiary alcohol in the presence of water or an organic acid. The reaction may be conveniently represented as follows:

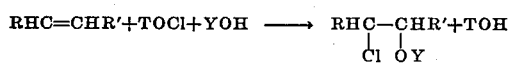

where R and R' are hydrogens or any organic radicals, TOCl is the hypochlorite of a tertiary alcohol and TOH is the corresponding alcohol, and Y is hydrogen or an acyl radical. When Y is hydrogen, YOH is water and a chlorhydrin is produced. When Y is an acyl radical, YOH is an organic acid and a chlorhydrin ester is produced. Bromine may be substituted for chlorine, thereby forming bromhydrins or their esters.

The criterion of operability of the organic compounds in my application and patent just referred to is the same as that in the present application—that is, the presence in such compounds of the double bond linkage (ethylene group) between two carbon atoms.

The reaction in the present process follows along lines which may be set forth broadly by the following equation:

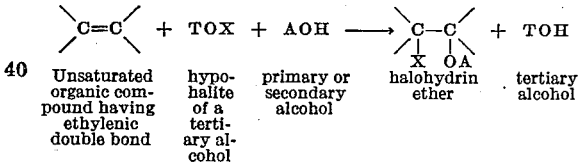

| Unsaturated organic compound having ethylenic double bond | hypohalite of a tertiary alcohol | primary or secondary alcohol | halohydrin ether | tertiary alcohol |

In this equation, X represents chlorine or bromine. The products are therefore: (1) the tertiary alcohol corresponding to the original hypohalite; and (2) the hypohalogenous ether. Thus, if TOX is tertiary butyl hypobromite and AOH is benzyl alcohol, the resulting products will be tertiary butyl alcohol and the benzyl bromhydrin ether of the particular unsaturated organic compound. Or if TOX is tertiary amyl hypochlorite and AOH is normal butyl alcohol, the resulting products will be tertiary amyl alcohol and the normal butyl chlorhydrin ether of the unsaturated organic compound.

The presence of water favors formation of the halohydrin; the presence of an organic acid favors formation of the halohydrin ester; hence the present reaction should preferably be carried out in the absence of water and organic acids, unless it is desired to make a mixture of the halohydrin ether with the halohydrin and/or the halohydrin ester.

The process of this invention can be readily carried out by the method illustrated in the following example:

Pentene-2 and methyl alcohol are mixed together and tertiary butyl hypochlorite is added, keeping the mixture at a temperature at which volatilization of the pentene-2 is avoided—say about 40° C. As the reaction proceeds, the temperature may be raised to promote completion,— say to about 60° to 70° C. The reactants are preferably used in substantially equimolecular proportions. The resulting product is a clear colorless solution consisting essentially of methyl chlor-amyl ether in tertiary butyl alcohol, and may be separated if desired into its components by suitable procedure such as distillation. The tertiary butyl alcohol boils at 83° C., the ether at 135 to 140° C.

When operating with unsaturated organic compounds which are normally gaseous—e. g. ethylene and propylene, the reaction is conveniently carried out under such conditions of low temperature and/or increased pressure as to maintain these unsaturated compounds in the liquid phase.

The tertiary alcohols obtained in the process of this invention may be readily reconverted to the corresponding hypochlorites (or hypobromites, as the case may be) for reuse. This reconversion may be carried out by any of the well-known procedures for effecting this result,—for instance, the alcohol may be mixed with milk of lime or a solution of caustic soda, cooled to about 10° C., and treated with chlorine or bromine to effect complete conversion. The tertiary hypohalite, being insoluble in water, is readily separated and washed free from reaction products.

It is thus clear that the present invention provides a method of obtaining chlorhydrin or bromhydrin ethers from unsaturated organic compounds, wherein loss of reactants or discarding or waste of by-products is avoided.

The foregoing description sets forth the invention in sufficient detail to allow of practical operation of the process upon the general class of materials defined. It should be understood, however, that the invention is not limited to the details of procedure which have been given, which are by way of example only.

I claim:

1. Process for preparing a halohydrin ether, which comprises reacting an unsaturated organic compound characterized by having a pair of carbon atoms linked by an ethylenic double bond, an alcohol of the group consisting of primary and secondary alcohols, and a hypohalite of a tertiary alcohol.

2. Process for preparing a halohydrin ether, which comprises reacting an unsaturated organic compound characterized by having a pair of carbon atoms linked by an ethylenic double bond, a primary alcohol, and a hypohalite of a tertiary alcohol.

3. Process for preparing a chlorhydrin ether, which comprises reacting an unsaturated organic compound having a pair of carbon atoms linked by an ethylenic double bond, a primary alcohol, and a hypochlorite of a tertiary alcohol.

4. Process for preparing a bromhydrin ether, which comprises reacting an unsaturated organic compound having a pair of carbon atoms linked by an ethylenic double bond, a primary alcohol, and a hypobromite of a tertiary alcohol.

5. Proces for preparing a chlorhydrin ether, which comprises reacting an unsaturated organic compound having a pair of carbon atoms linked by an ethylenic double bond, a primary alcohol, and a tertiary alkyl hypochlorite.

6. Process for preparing a bromhydrin ether, which comprises reacting an unsaturated organic compound having a pair of carbon atoms linked by an ethylenic double bond, a primary alcohol, and a tertiary alkyl hypobromite.

7. Process for preparing a chlorhydrin ether, which comprises reacting an unsaturated organic compound having a pair of carbon atoms linked by an ethylenic double bond, a primary alcohol, and tertiary butyl hypochlorite.

8. Process for preparing a bromhydrin ether, which comprises reacting an unsaturated organic compound having a pair of carbon atoms linked by an ethylenic double bond, a primary alcohol, and tertiary butyl hypobromite.

9. Process for preparing a chlorhydrin ether, which comprises reacting an olefin, a primary alcohol, and a hypochlorite of a tertiary alcohol.

10. Process for preparing a chlorhydrin ether, which comprises reacting an olefin, a primary alcohol, and a tertiary alkyl hypochlorite.

11. Process for preparing a bromhydrin ether, which comprises reacting an olefin, a primary alcohol, and a tertiary alkyl hypobromite.

12. Process for preparing a chlorhydrin ether, which comprises reacting an olefin, a primary aliphatic alcohol, and tertiary butyl hypochlorite.

13. Process for preparing a bromhydrin ether, which comprises reacting an olefin, a primary aliphatic alcohol, and tertiary butyl hypobromite.

14. Process for preparing methyl chlor-amyl ether, which comprises reacting together pentene-2, methyl alcohol, and tertiary butyl hypochlorite.

15. Process for preparing a halohydrin ether, which comprises reacting a hydrocarbon containing the ethylenic double bond, an alcohol of the group consisting of primary and secondary alcohols, and a hypohalite of a tertiary alcohol.

16. Process for preparing a chlorhydrin ether, which comprises reacting a hydrocarbon containing the ethylenic double bond, a primary alcohol, and a tertiary alkyl hypochlorite.

17. Process for preparing a bromhydrin ether, which comprises reacting a hydrocarbon containing the ethylenic double bond, a primary alcohol, and a tertiary alkyl hypobromite.

18. Process for preparing a halohydrin ether which comprises reacting an olefin, an alcohol of the group consisting of primary and secondary alcohols, and a hypohalite of a tertiary alcohol.

19. Process for preparing a halohydrin ether which comprises reacting an olefin, an alcohol of the group consisting of primary and secondary alcohols, and a tertiary hypohalite.

CHARLES G. HARFORD.